Sept. 25, 1951  E. E. HUPP  2,569,003
CLUTCH CONTROL MECHANISM
Filed Aug. 27, 1945  2 Sheets-Sheet 1
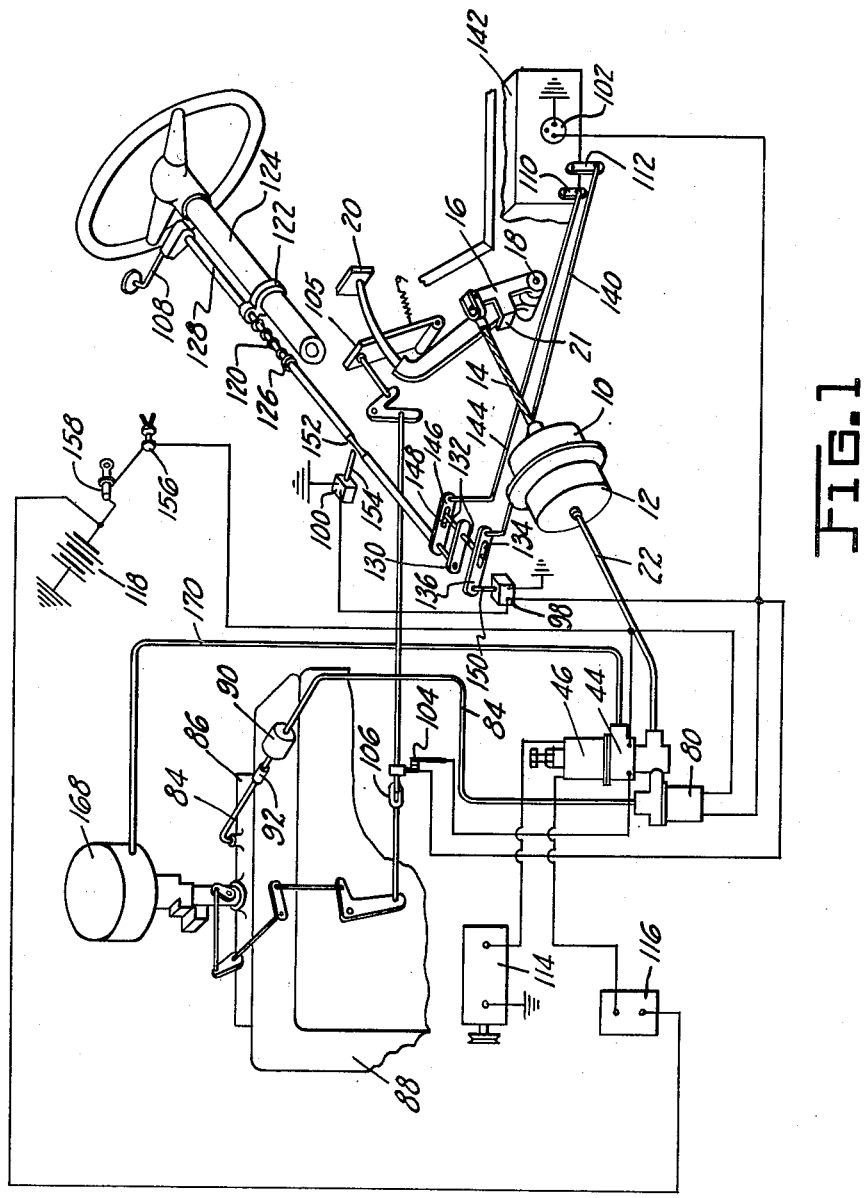
INVENTOR.
EDWARD E. HUPP
BY
H. O. Clayton
ATTORNEY

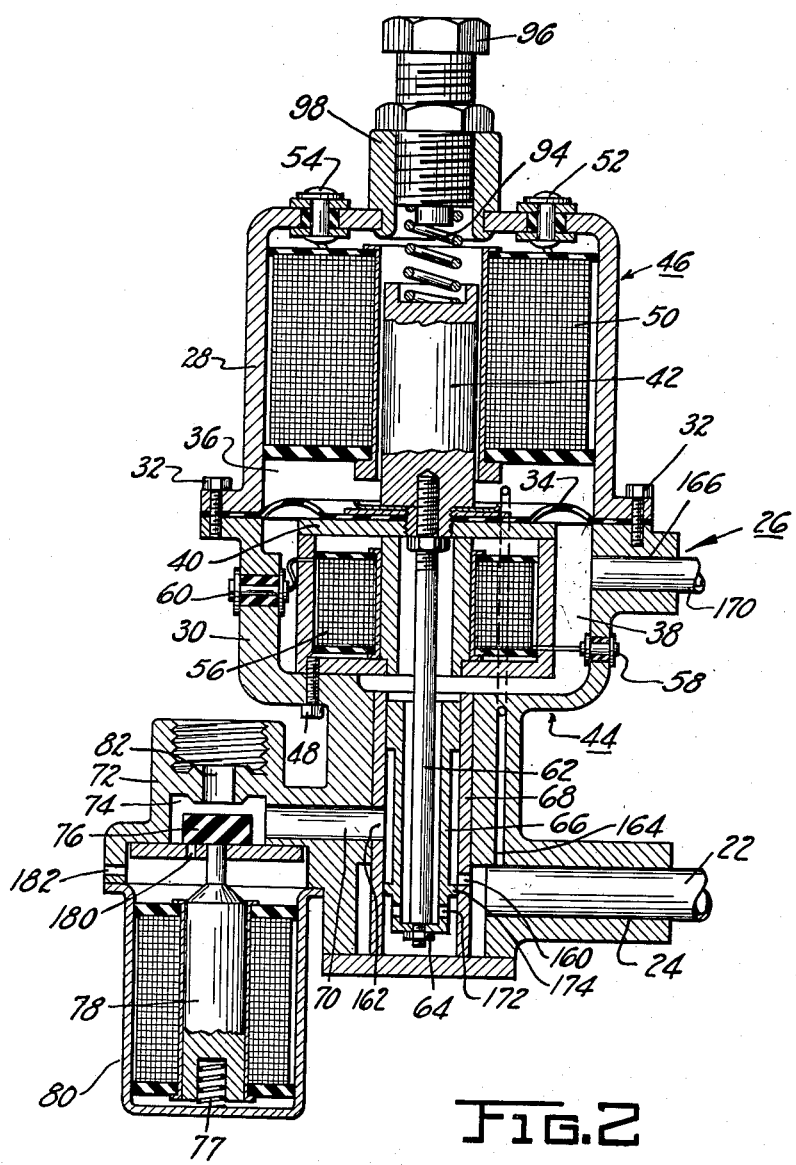

Patented Sept. 25, 1951

2,569,003

UNITED STATES PATENT OFFICE 2,569,003

CLUTCH CONTROL MECHANISM

Edward E. Hupp, South Bend, Ind., assignor to Bendix Aviation Corporation, South Bend, Ind., a corporation of Delaware Application August 27, 1945, Serial No. 612,812

6 Claims. (Cl. 192—.052)

This invention relates in general to clutch control mechanism and in particular to a pressure differential operated clutch control mechanism for operating the friction clutch of an automotive vehicle.

It is an object of my invention to provide power means for operating the friction clutch of an automotive vehicle said power means including a pressure differential operated motor controlled by an operation of the accelerator of the vehicle, the shift lever of the vehicle, a vehicle speed responsive governor and means operable in accordance with the speed of the engine of the vehicle.

When the friction clutch of an automotive vehicle is operated by a power means it is of course desirable that said power means simulate as closely as possible a skillful manual operation of the clutch. It is therefor the most important object of my invention to provide a clutch operated pressure differential operated motor, the power element of which is so controlled that in effecting the clutch engaging operation of the said motor the load of said clutch plates is directly proportional to the R. P. M. of the internal combustion engine of the vehicle; for by this operation there is, under all conditions of clutch operation, sufficient force developed by the engine to drive the driving plate of the clutch.

Yet another object of my invention is to provide a two stage pressure differential operated motor for operating the friction clutch of an automotive vehicle, the clutch disengaging operation of said motor being in large measure controlled by an operation of a three way valve controlled by an operation of the accelerator, a vehicle speed responsive governor and the transmission controlling shift lever of the vehicle; and the clutch engaging operation of said motor being in large measure controlled by an air bleed operation of said three-way valve said operation being controlled by an operation of the accelerator, the generator of the vehicle or other engine speed responsive mechanism, and a governor controlled vacuum cut-in valve.

A further object of my invention is to provide power means for operating the friction clutch of an automotive vehicle said power means including a single-acting pressure differential operated motor controlled by an accelerator, a gear shift lever and a governor controlled three-way valve operable to effect a clutch disengaging operation of said motor and to initiate the first stage of a two-stage clutch engaging operation of said motor, the clutch plate contacting operation, that is, the second stage of operation of said motor, being controlled by a bleed valve operation of said three way valve and being operable to control the flow of air into said motor, said bleed valve operation being controlled by an engine speed responsive means and by a pressure differential operated motor operable in accordance with the degree of gaseous pressure within the clutch operating motor.

A further object of my invention is to provide power means for operating the friction clutch of an automotive vehicle said power means including a single-acting pressure differential operated motor controlled by a power operated three-way valve said valve being operative with the release of the accelerator and with an operation of the shift lever of the vehicle or a vehicle speed responsive governor to effect a clutch disengaging operation of the motor said valve being also operative, with a depression of the accelerator, an operation of either the governor or the shift lever and an operation of an engine speed responsive electromagnet, to effect a clutch engaging operation of the motor the load of the clutch plates of the clutch being directly proportional to the speed of the engine.

The most important object of my invention however is to provide a pressure differential operated motor for operating a friction clutch of an automotive vehicle said motor being controlled by a single valve unit said unit including an electrical means operative in conjunction with the operation of other electrical controls, to effect a clutch disengaging operation of the motor when the accelerator is released and either the shift lever of the car is moved to effect an operation of the transmission or the car is slowed down below a certain speed, said electrical means being also operative, in conjunction with an operation of the aforementioned controls, to effect a second stage clutch engaging operation of the motor the loading of the clutch plates during this operation being directly proportional to the speed of the engine.

Yet another object of my invention is to provide power means for operating a standard friction clutch of an automotive vehicle said power means being controlled by an electrically controlled valve unit said valve unit comprising a pressure balanced three-way valve and a solenoid operated vacuum cut-off valve.

A further object of my invention is to provide a single-acting pressure differential operated motor for moving the driven plate of the friction clutch to its clutch disengaged position and for controlling the operation of the clutch springs in their operation of moving said driven clutch plate into engagement with the driving clutch plate, the clutch engaging operation of said motor being controlled in part by a pressure balanced type of follow-up valve said valve being controlled by an operation of the accelerator and the generator of the vehicle or other mechanism the operation of which is directly proportional to the speed of the engine.

Yet another and important object of my invention is to provide a vacuum operated motor for operating the friction clutch of an automotive vehicle said motor being controlled by a single electromagnetically controlled compact valve unit.

Other objects of the invention are referred to in connection with the following detailed description of the accompanying drawings, which represents a preferred embodiment of the invention. After considering this example, skilled persons will understand that many variations may be made without departing from the principles disclosed; and I contemplate the employment of any structures, arrangements or modes of operation that are properly within the scope of the appended claims.

Figure 1 is a diagrammatic view disclosing the principal elements of the clutch control mechanism constituting my invention; and Figure 2 is a sectional view of the control unit constituting the essence of my invention.

Describing now that embodiment of my invention disclosed in the several figures of the drawing the principal elements thereof consist of a single acting vacuum motor 10 comprising a casing 12 and a power element such as a piston, not shown, which is connected to a friction clutch, not shown, of a conventional design, that is, one including driving and driven elements. One end of the casing of the motor, a portion of the body thereof, and the power element together outline the control chamber, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a stop 21 extending from the crank 16, is also preferably included in the clutch operating mechanism.

One end of the motor 10, that is the end of the same constituting a part of the aforementioned power compartment, is connected by a conduit 22 to an outlet port 24 of a control valve unit 26. This unit, constituting the most important feature of my invention, includes a three way valve, means for actuating said valve, a vacuum cut-off valve and means for actuating said cut-off valve. The entire control valve mechanism of my invention is built into this simple compact unit 26 and the parts of the same are so constructed and arranged that the valve may be easily serviced.

Describing now the details of the control valve unit 26 the same include two hollow casing members 28 and 30 secured together by fastenings 32 which fastenings also serve to clamp a diaphragm 34 in place between said casing members. It follows therefore that by virtue of the diaphragm there are provided two valve compartments said compartments being indicated by the reference numerals 36 and 38. To the central portion of the diaphragm there are secured armatures 40 and 42 of electromagnets 44 and 46 respectively. The former electromagnet is housed within the compartment 38 and is secured to the casing member 30 by a fastening 48. The winding 50 of the electromagnet 46 is wired to terminals 52 and 54 mounted in the casing member 28 and the winding 56 of the electromagnet 44 is wired to terminals 58 and 60 mounted in the casing member 30. To the armature 40 there is threadedly secured a pin 62 and said pin extends within and is secured at 64 to one end of a hollow spool shaped three-way valve member 66. This valve is slidably mounted within a sleeve member 68 which is preferably fixedly mounted within one end of the valve casing member 30. The latter member is provided with a duct 70 leading to a casing projection 72 which is recessed at 74 to house a vacuum cut-off valve member 76. This valve member is moved upwardly and downwardly respectively by a spring 77 and the armature 78 of a solenoid 80 said movement serving to cover or uncover a port 82; and to this port there is secured a conduit 84 leading to the intake manifold 86 of the internal combustion engine 88 of the vehicle. A vacuum tank 90 may be included in this fluid transmitting connection between the manifold and cut-off valve 76 and the evacuation of said tank is insured by the inclusion of a check valve 92 incorporated in said connection.

Completing the description of the principal features of the valve unit 26 the armature 42 is biased downwardly, Figure 2, by a spring 94 said spring being interposed between one end of said armature and one end of a screw 96 which is adjustably mounted in a fitting 98 secured to the casing member 28.

Describing now the electrical control means of my invention as is disclosed in Figure 1 the electromagnet 80, which together with the spring 77 operates the vacuum cut-off valve 76, is controlled by grounded selector lever operated switches 98 and 100 and by a grounded vehicle speed responsive governer operating switch 102; and the winding 56 of the electromagnet 44, operative to actuate the valve member 66, is controlled by the aforementioned switches 98, 100 and 102 and by an accelerator operated switch 104. The construction of the latter switch and its connection with the accelerator 105 is such that the same is closed when the accelerator is completely released and is opened prior to taking up the lost motion of a lost motion connection 106. A transmission and clutch operating selector lever 108 is connected with the switches 98 and 100 and with the transmission operating cranks 110 and 112, by the force transmitting links and levers disclosed in Figure 1. The construction of these connections is described in detail hereinafter.

As to the electrical means for controlling the electromagnet 46 as is disclosed in Figure 1 said electromagnet is preferably wired to a source of electrical current for example the generator 114 whereby the degree of energization of said electromagnet, that is the degree of current flowing through the winding 50, is directly proportional to the R. P. M. of the internal combustion engine of the vehicle. A voltage regulator 116, wired to the battery 118 and to the electromagnet 46 may be included in the electrical hookup. It is to be particularly noted however that the current flow through the electromagnet 46 need not necessarily be controlled by the generator 114 of the car; for it is within the purview of my invention to employ any engine driven mechanism as a means for controlling the current sent through the winding 50 it being absolutely necessary however that the degree of said current be directly proportional to the speed of the engine.

Describing now in detail the aforementioned shift lever operated force transmitting means for actuating the switches 98 and 100 and the transmission operating cranks 110 and 112, a spring 120, interposed between a stop 122 fixedly secured to the steering post 124 of the vehicle and a stop 126 fixedly secured to a shaft 128, serves to bias said shaft downwardly to the position disclosed in Figure 1. Now to the lower end of the shaft 128 there is fixedly secured a crank 130 through which extends a pin 132; and when said shaft is moved downwardly by the spring 120 one end of said pin extends within a slot 134 within a floating crank 136. To one end of the crank 134 there is pivotally connected a rod 140 said rod being pivotally connected to one end of the crank 112. This crank when rotated clockwise serves to actuate the other force transmitting means within the casing of a three speeds forward and reverse transmission 142 to establish the transmission in its high gear setting; when the crank 136 is rotated counterclockwise said transmission is established in its second gear setting.

The crank 110 when rotated clockwise serves to establish the transmission 142 in its low gear setting and when rotated counterclockwise serves to establish said transmission in reverse gear. The connection between the crank 110 and the shift lever 108 includes a link 144 pivotally connected to a floating lever 146 said lever being slidably mounted on the shaft 128. This lever 146 is provided with a slot 148 to receive one end of the pin 132.

When the driver wishes to establish the transmission in its second gear setting he rotates the shift lever 108 counterclockwise and this operation serves to rotate the floating lever 136. Now the switch 98 is preferably so constructed that the force necessary to close the same, that is, the force necessary to compress a spring within the switch connected to its movable contact, is less than the force necessary to effect the initial movement of the high, second shift rail of the transmission. It follows therefore that the initial movement of the shift lever results in a pivoting of the lever 136 about its connection with the link 140; and this operation results in a closing of the clutch controlling switch 98. Continued movement of the shift lever, that is, the movement after the switch 98 is closed and there is no possible further movement of a link 150 interconnecting the lever 136 with said switch, results in a pivoting of said lever about its pivotal connection with the link 150; and this operation results in the operation of the transmission to establish the same in its second gear setting. After this setting is established the driver removes his hand from the shift lever whereupon the aforementioned spring within the switch 98 operates to open said switch. This switch is so constructed that the same is also closed when the driver moves the shift lever to establish the transmission in its high gear setting; and the spring means within said switch also functions to open the same when the high gear setting of the transmission has been established and the driver removes his hand from the shift lever.

Describing the operation of the switch mechanism to establish the transmission in either reverse gear or low gear the driver first rotates the shift lever upwardly in a plane perpendicular to the plane of the steering wheel; and this operation serves to bodily move the shaft 128 upwardly against the tension of the spring 120. The upper end of the pin 132 is by this operation moved into the slot 148; and a subsequent rotation of the shift lever, either to establish the transmission in reverse or low gear, results in a rotation of the cranks 130 and 110 and the lever 146 to effect one or the other of these settings of the transmission. The shaft 128 is provided with a recessed portion 152 which receives a pin 154 operably connected to the grounded switch 100; and as will be obvious from an inspection of Figure 1 when said shaft is moved upwardly, in the operation of establishing the transmission in either reverse gear or low gear, the switch 100 is closed by virtue of the forcing of the pin 154 to the left, Figure 1, when the end of said pin is forced out of the recess 152 and onto the full bodied portion of the shaft.

There is thus provided, by the above described shift lever operated switch mechanism, means for effecting a clutch disengaging operation of the motor 10 during the first increment of movement of the shift lever as it is moved to establish the transmission in one of its four gear settings. To effect this operation however it is of course necessary to first release the accelerator to close the switch 104. The parts of the mechanism are preferably so constructed and arranged that the clutch is disengaged before the transmission is operated. It is to be noted that the switch operating force transmitting means of my invention is such as to effect a closing of the switch mechanism when the shift lever is moved in either one of two different planes.

Briefly describing this clutch disengaging operation when the switch 104 and one or the other of the switches 98, 100 and 102 is closed then the ground connection to the electromagnet 44 is completed; and as described in Figure 1, the hot wire from the said electromagnet includes a cutout switch 156, the ignition switch 158 of the electrical system of the car and the grounded battery 118.

With the closing of the latter circuit the electromagnet 44 is energized and with this operation the valve 66 is operated to effect a connection with the intake manifold thereby energizing the motor 10 to effect a disengagement of the clutch. The electrical circuit including the electromagnet 80 is also closed with this operation thereby effecting an opening of the valve 76 to provide a source of vacuum.

Describing now the complete operation of the mechanism constituting my invention and incidentally completing the description of the parts thereof not heretofore described, when the accelerator 105 is released to close the engine throttle and thereby idle the internal combustion engine 88 the intake manifold 86 of said engine is partially evacuated and there is thus provided a source of vacuum for energizing the motor 10 to disengage the friction clutch of the automotive vehicle; and as described above this operation is effected with a release of the accelerator and either a gear shifting operation of the shift lever 108 or a lowering of the speed of the vehicle below governor speed to close the switch 102, either of said operations effecting an energization of the solenoid 44 to effect an opening of the valve 66. Now at this juncture it is to be explained that the parts of the mechanism of my invention are so constructed and arranged and so operative that at this time the valve 66 and means for operating the same assume the relative positions disclosed in Figure 1. The small bodied portion of the valve 66 moves to place ports 160 and 162 in the sleeve 68 in communication with each other thereby interconnecting the vacuum tank 90 with the control chamber of the motor 10. Now at this time the diaphragm 34 and the valve 66 connected thereto are biased upwardly, Figure 2, by virtue of the differential of pressures to which the diaphragm is subjected; for the compartment 36 is at the time, by virtue of a connection with the motor 10, partially evacuated the gaseous pressure within said compartment being equal to that within the control chamber of said motor. This result is accomplished by means of a duct 164, Figure 2, in the valve casing. Now the compartment 38 of the control unit 26 is at the time vented to the atmosphere by a port 166 connected to an air cleaner 168 by a conduit 170, accordingly it follows that the diaphragm 34 is loaded by the differential of pressures acting on the same to bias the same upwardly. The valve member 66 is also at this time, that is, when the engine 88 is idling and the solenoid 44 is energized to effect a disengagement of the clutch, biased downwardly, Figure 2, by the loading of the spring 94 and upwardly by the engine idling loading of the electromagnet 46. It is apparent therefore that the resultant of the four loadings to which the valve member 66 is then subjected effects the above described valve open, that is, clutch disengaging position of the valve member 66.

Continuing the description of a cycle of operations of the clutch control mechanism of my invention, to initiate a clutch engaging operation of the motor 10 the driver either depresses the accelerator to open the switch 104 as the lost motion connection 106 is being taken up or removes his hand from the shift lever 108 after completing the operation of establishing the transmission in gear. This latter operation serves of course to open one or the other of the switches 98 and 100 depending upon which one had been closed by an operation of the shift lever. The solenoid 44 is, by either of these operations, deenergized resulting in an unbalancing of the aforementioned four loadings maintaining the valve 66 in its open position; and this operation results in an upward movement of said valve to vent the motor 10 to the atmosphere. There is then a flow of air into the motor 10 via the air cleaner 168, conduit 170, port 166, chamber 38, the interior of the valve member 66, a port 172 in said member, ports 160 and 24 and the conduit 22. The clutch springs then function to move the driven clutch plate toward the driving clutch plate and the parts of the mechanism are so constructed and arranged that when the gaseous pressure within the control chamber of motor 10 reaches a certain factor said movement is arrested by the lapping of the valve member 66 this operation preferably taking place when the clutch plates contact lightly, that is, with a load insufficient to either stall the engine or effect a movement of the car from a position of rest. Describing this clutch engaging operation of the mechanism in other words, the summation of the idling engine loading of the electromagnet 46 plus the loading effected by the diaphragm 34 minus the loading effected by the spring 94 is such as to first effect an upward movement of the valve member 66 to vent the motor to the atmosphere to initiate the above described first stage of clutch engaging operation; and when the gaseous pressure within the compartment 36 reaches a certain factor then said valve member automatically moves downwardly to lap the three-way valve member 66. In effecting this operation it is to be remembered that the gaseous pressures within the motor 10 and the compartment 36 are the same at all times. In this lapped position of the valve member a land portion 174 of said member covers the port 160.

To effectively engage the clutch, that is, bring the clutch plates into driving contact with each other the driver then depresses the accelerator to open the throttle thereby increasing the speed of the engine above its idling speed; and this operation upsets the above described valve lapping equilibrium of forces by increasing the loading on the valve member 66 from the electromagnet 46. It follows therefore that the valve member 66 is again moved upwardly to vent the motor 10 and compartment 36 to the atmosphere; and as a result of this operation when the gaseous pressure within said compartment is increased sufficiently to offset the increase in loading from the electromagnet 46 then the valve is again lapped. It follows therefore that the summation of the three forces acting to lap the valve is a constant. It will be apparent therefore that subsequent increases in the speed of the engine results in an increase in the clutch plate loading said loading being at all times directly proportional to the engine speed.

It is apparent therefore that with the clutch control mechanism of my invention there is provided means for effecting a disengagement of the clutch whenever the accelerator is released sufficiently to close the switch 104 and when either the car is travelling below governor speed or the gear shift lever 108 is operated to shift gears in the transmission. To engage the clutch the driver depresses the accelerator to open the switch 104 or removes his hand from the shift lever after completing an operation of the transmission said latter operation effecting an opening of either one or the other of the switches 98 and 100; and this operation results in a first stage of engagement of the clutch. The second stage of engagement of the clutch, in which the degree of loading of the clutch plates is directly proportional to the speed of the engine, is effected by an opening of the throttle.

Describing the operation of the vacuum cut-off valve 76 it is to be noted that with this valve incorporated in the mechanism the clutch may be disengaged when and only when either the car is travelling below governor speed or the gear shift lever is operated to operate the transmission; for then said valve 76 is open to provide a source of vacuum to make possible an energization of the motor 10. Above governor speed, that is, when the vehicle speed is such that the electromagnet 80 is deenergized, the clutch control motor is inoperative to disengage the clutch; for said motor is then vented to the atmosphere via ports 180 and 182 in the casing housing the electromagnet 80 and the other connections with the motor 10 disclosed in Figure 2. Now below governor speed it is desirable to maintain the valve member 66 in communication with the source of vacuum, that is, the tank 90; for if during the operation of engaging the clutch the engine speed, due to say an engine laboring operation, is unduly slowed down then it is desirable to at once decrease the clutch plate loading which causes this undesirable operation of the engine. This operation will be effected with the mechanism of my invention inasmuch as the valve member 66 will then momentarily reconnect the clutch motor with the vacuum tank.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described being merely a preferred embodiment.

I claim:

1. In an automotive vehicle provided with a friction clutch, power means for operating said clutch to effect a disengagement of the clutch and a controlled engagement thereof said power means comprising a pressure differential operated motor the power element of which is operably connected to the clutch, and valve means for controlling the operation of said motor including a hollow casing ported to provide an atmospheric vent opening, a port to be connected to the aforementioned motor, a port to be connected with a source of vacuum, a reciprocable three-way valve member housed within said casing said member being movable to one position to interconnect the two aforementioned ports and to another position to interconnect the first mentioned port with the atmospheric vent opening, and means, within said casing, for actuating said reciprocable valve member to control the operation of the valve means, said valve actuating means including a solenoid operable, when energized, to move the valve member to the first of the aforementioned two positions, said means further including an electromagnet, a spring and a pressure differential operated diaphragm for controlling the movement of the valve member to a position to vent the motor to the atmosphere and to then lap said member to thereby cut off the flow of air to or from the motor.

2. In an automotive vehicle provided with a friction clutch, an internal combustion engine, a gear shift lever, a vehicle speed responsive governor, an accelerator, a throttle, and means, including a lost motion connection, interconnecting the accelerator and throttle; power means for operating said clutch to effect a disengagement of the clutch and a two-stage engagement thereof, said power means comprising a pressure differential operated motor the power element of which is operably connected to the clutch, and valve means for controlling the operation of said motor, including, as a single unit, a hollow casing, a reciprocable three-way valve member housed within said casing, means within the casing for actuating said valve member comprising an electromagnet operable, when energized, to effect a clutch disengaging operation of the motor and further comprising an electromagnet, a spring and a pressure differential operated diaphragm operable to effect a controlled clutch engaging operation of the valve member, together with electrical means for controlling the operation of said electromagnets including an accelerator operated switch opened during the taking up of the aforementioned lost motion connection and further including shift lever operated switch mechanism and a governor operated switch, the latter switches and switch mechanism serving to control the operation of the first mentioned electromagnet.

3. Power means adapted to operate the friction clutch of an automotive vehicle comprising a pressure differential operated motor, and valve means for controlling the operation of said motor, including a hollow casing ported to provide an atmospheric vent opening, a port to be connected to the aforementioned motor, a port to be connected with a source of vacuum, a reciprocable three-way valve member housed within said casing, said member being movable to one position to interconnect the two aforementioned ports and to another position to interconnect the first mentioned port with the atmospheric vent opening, and means, within said casing, for actuating said reciprocable valve member to control the operation of the valve means, said valve actuating means including an electromagnet and a pressure differential operated power element operative to move the valve member in one direction and further including an electromagnet and a spring operative to move the valve member in the opposite direction.

4. Power means for operating the friction clutch of an automotive vehicle including a pressure differential operated motor operably connected to the clutch, valve means for controlling the operation of said motor including a valve casing having a vacuum port adapted to be connected to a source of vacuum, an atmospheric port and a port adapted to be connected to said motor, a reciprocable pressure balanced valve member within said casing operable in one of its positions to interconnect the vacuum port with the port connected to the motor and operable in another of its positions to interconnect the atmospheric port with the port connected to the motor, means within the valve casing for actuating the valve member including four separate loading elements, the operation of said four elements serving to move the valve member to control the operation of the clutch operating motor, and means for controlling the operation of said loading elements.

5. Power means for operating the friction clutch of an automotive vehicle including a pressure differential operated motor operably connected to the clutch, valve means for controlling the operation of said motor including a valve casing having a vacuum port adapted to be connected to a source of vacuum, an atmospheric port and a port adapted to be connected to said motor, a reciprocable valve member within said casing operable in one of its positions to interconnect the vacuum port with the port connected to the motor and operable in another of its positions to interconnect the atomspheric port with the port connected to the motor, means within the valve casing for actuating the valve member including two separate electromagnetic means, a pressure differential operated diaphragm, and a spring, and means for controlling the operation of said electromagnetic means, diaphragm and spring.

6. Power means for operating the friction clutch of an automotive vehicle including a pressure differential operated motor operably connected to the clutch, valve means for controlling the operation of said motor including a valve casing having a vacuum port adapted to be connected to a source of vacuum, an atmospheric port and a port adapted to be connected to said motor, a reciprocable valve member within said casing operable in one of its positions to interconnect the vacuum port with the port connected to the motor and operable in another of its positions to interconnect the atmospheric port with the port connected to the motor, means within the valve casing for actuating the valve member including two separate electromagnetic means, a pressure differential operated diaphragm, and a spring, and means for controlling the operation of said electromagnetic means, diaphragm and spring, including an accelerator operated switch, a governor operated switch and gear shift lever operated switch means.

EDWARD E. HUPP.

REFERENCES CITED

The following references are of record in the file of this patent:

UNITED STATES PATENTS

| Number | Name | Date |
|---|---|---|
| 2,049,738 | Hill et al. | Aug. 4, 1936 |
| 2,317,216 | Paton | Apr. 20, 1943 |
| 2,326,943 | Hill | Aug. 17, 1943 |
| 2,365,469 | Hey et al. | Dec. 19, 1944 |
| 2,391,192 | Price | Dec. 18, 1945 |